(12) United States Patent
Coopes et al.

(10) Patent No.: US 12,353,776 B2
(45) Date of Patent: *Jul. 8, 2025

(54) USING A CUSTOM PRINTER DRIVER TO AUTOMATICALLY ELECTRONICALLY CREATE, CAPTURE AND MANAGE ALL DOCUMENTS UTILIZED IN A TRANSACTION, WITH AUTOMATIC UPLOAD AND VERIFICATION OF DOCUMENTS

(71) Applicant: Unite Digital, LLC, Bloomfield Hills, MI (US)

(72) Inventors: Stacey Coopes, Birmingham, MI (US); Ryan Soffa, Charter Township of Commerce, MI (US); Ronald Len, Bloomfield Hills, MI (US); Marcus Clayton Cox, Bloomfield Hills, MI (US)

(73) Assignee: Unite Digital LLC, Bloomfield Hills, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/935,271

(22) Filed: Nov. 1, 2024

(65) Prior Publication Data

US 2025/0060920 A1 Feb. 20, 2025

Related U.S. Application Data

(63) Continuation-in-part of application No. 17/891,075, filed on Aug. 18, 2022.

(Continued)

(51) Int. Cl.
*G06F 3/12* (2006.01)
*G06Q 50/26* (2024.01)

(52) U.S. Cl.
CPC .......... *G06F 3/1243* (2013.01); *G06F 3/1206* (2013.01); *G06Q 50/265* (2013.01)

(58) Field of Classification Search
CPC .... G06F 3/1243; G06F 3/1206; G06Q 50/265
See application file for complete search history.

(56) References Cited

U.S. PATENT DOCUMENTS

| | | | |
|---|---|---|---|
| 11,930,148 B2 * | 3/2024 | Coopes | G06Q 20/389 |
| 2006/0288269 A1 * | 12/2006 | Oppenlander | G06F 40/174 |
| | | | 707/999.1 |
| 2007/0094296 A1 * | 4/2007 | Peters, III | G06Q 10/10 |
| | | | 707/999.102 |

FOREIGN PATENT DOCUMENTS

| | | |
|---|---|---|
| CN | 110 379 476 A | 10/2019 |
| CN | 111 539 000 A | 8/2020 |

OTHER PUBLICATIONS

Supplementary European Search Report and Written Opinion for 22862158.7-1218 / 4392890 PCT/US2022041750, dated Mar. 11, 2025, 12 pages.

(Continued)

*Primary Examiner* — Akwasi M Sarpong
*Assistant Examiner* — Michael L Burleson
(74) *Attorney, Agent, or Firm* — Brill Law Office; Jeffrey Brill

(57) ABSTRACT

A plurality of electronic documents utilized in a transaction are automatically managed. For each separate document of the plurality, a custom printer driver receives instructions to a printer for printing the document. Instead of printing the document, the custom printer driver creates a file in a standard format such as PDF containing the document, based on the received print instructions. Content concerning the transaction is automatically added to at least one corresponding field of the file containing the document in the standard format. Files containing documents in the standard (Continued)

format are saved with the added content concerning the transaction, and saved files are associated with the transaction. In some implementations, files containing documents in the standard format are automatically uploaded and validated.

20 Claims, 6 Drawing Sheets

Related U.S. Application Data

(60) Provisional application No. 63/237,457, filed on Aug. 26, 2021.

(56) References Cited

OTHER PUBLICATIONS

How To Do Stuff?, "How to Add Auto Changing Date Box in Fillable PDF Form", YoTube, Dec. 17, 2018, 2 pages, retrieved from https://www.youtube.com/watch?v=X4LXy9 RgOcA.

* cited by examiner

USING A CUSTOM PRINTER DRIVER TO AUTOMATICALLY ELECTRONICALLY CREATE, CAPTURE AND MANAGE ALL DOCUMENTS UTILIZED IN A TRANSACTION, WITH AUTOMATIC UPLOAD AND VERIFICATION OF DOCUMENTS

CROSS-REFERENCE TO RELATED APPLICATION

The present application is a continuation-in-part and claims the benefit of U.S. patent application Ser. No. 17/891,075, entitled "Using a Custom Printer Driver to Automatically Electronically Create, Capture and Manage all Documents Utilized in a Transaction," filed on Aug. 18, 2022. U.S. patent application Ser. No. 17/891,075 claims the benefit under 35 U.S.C. § 119 (e) of U.S. Provisional Patent Application Ser. No. 63/237,457, entitled "A Printer Driver installed on automotive dealership computers allowing users to capture all documents required to consummate the purchase or lease transaction without the need to actually print or upload files," filed on Aug. 26, 2021, the entire contents of which are incorporated herein by reference.

TECHNICAL FIELD

This disclosure pertains generally to electronic management of documents used in a transaction such as the purchase or lease of a vehicle, and more specifically to using a custom printer driver to automatically create, capture and manage all documents utilized in a transaction electronically, without requiring the actual printing or utilization of physical documents, and where the documents for the transaction may vary based on geolocation and/or other circumstances, and with support for automatic upload and verification of documents.

BACKGROUND

Many transactions are now conducted entirely online without the need for customers to leave their home, such as purchasing clothes, electronics, household goods, etc. However, certain types of transactions are still often performed at least partially in-person, outside of the customer's home. One example of such a transaction is the purchase or lease of a car or other vehicle. These transactions require the execution of a large number of documents from different sources, such as a sales contract from the dealer, licensing and registration forms from the state, financing documentation from a financial institution, an extended warranty from another party, etc. In such a transaction, the number and type of specific documents to be executed varies, depending upon the location at which the purchase occurs (e.g., different states and counties have different licensing, registration and taxing schemes, and different forms for the execution thereof). The specific documents to be signed also vary based on the exact nature of the transaction (e.g., whether the customer has a trade-in, the terms of the financing if any, whether the customer is purchasing specific third-party add-on services such as rustproofing, an extended warranty, etc.).

Conventionally, the customer takes time out from his or her busy schedule to make one or multiple trips to the dealership to select and purchase a vehicle, and execute this large collection of paper documents. These trips to the dealership and the signing process itself are extremely inconvenient for the customer. In addition, managing and organizing all of these different documents is inconvenient for both the customer and the dealer. The customer is typically handed a large stack of copies of the executed paper documents, which ideally the customer files but in practice often loses. The dealer has legal record keeping requirements, which are burdensome. For example, federal and state law requires different forms to be maintained by the dealer for given periods of time.

Some conventional online systems exist to assist a customer in the online purchase of a vehicle. By using such a conventional system, a customer may be able to select a specific vehicle and initiate the purchase process online. Nonetheless, the large collection of documents described above still needs to be executed to complete the transaction. Because these forms are from multiple sources and vary by geographic region, conventional systems manage these forms piecemeal. An individual dealer may support an electronic sales contract, whereas some states may allow online completion of registration or licensing documents. Some conventional systems may electronically communicate with these parties and provide support for electronic completion of a subset of the forms required for the transaction. However, when using conventional systems, at some point the customer needs to physically sign at least some physical documents to complete the process.

From the dealer's perspective, some conventional electronic systems exist for transaction management. These maintaining some documents conventional systems support electronically, but because of the varied nature of the forms and their sources, no conventional systems support managing all of the forms for the transaction even for a single dealer, much less for any dealer in any state. To access specific forms electronically, conventional systems access the servers of individual document sources (e.g., departments of motor vehicles, financial institutions, providers of warranties, etc.) through separate Application Programming Interfaces (APIs) exposed by these parties. This is less than ideal because not all parties that provide documents needed for the transaction make their documents available electronically in this way. Even for those that do so, the exposed APIs tend to be updated less frequently than the documents themselves, and thus the conventional systems do not necessarily support current versions of the required documents. Further, conventional systems do not support the different requirements based on geographic location, and thus a conventional system used by a dealer in one state would not automatically work for a dealer located in another.

Further, conventional systems do not support the automatic upload and verification of documents in these contexts.

It would be desirable to address these issues.

SUMMARY

A collection of documents utilized in a transaction such as the purchase or lease of an automobile from a dealership is automatically managed through the use of a custom printer driver. Completing such a transaction typically requires the processing of multiple documents in various formats from different sources. For example, the purchase of a car may require the execution of a sales contract provided by the dealership, local state licensing and registration documents provided by the Department of Motor Vehicles or Department/Secretary of State, a financing contract provided by a lender and an extended warranty provided by a separate external company. This is of course just an example, and the specific documents and sources vary based on the nature of the transaction, the state in which it occurs, the financing plan, the terms/options selected by the customer, etc.

As described in detail below, an electronic transaction management system running on one or more computer system(s) at the dealership and/or in the cloud in conjunction with a custom printer driver enables all of the documents for the entire transaction to be completed, managed and signed electronically, without requiring any ink signatures or processing of paper documents. The customer can start the transaction by browsing the dealer's website, either on his/her own or after being redirected there by a vehicle Original Equipment Manufacturer (OEM). Once the customer has selected a vehicle online and initiated the transaction, the dealer may start the process using the electronic transaction management system.

The electronic transaction management system assembles the electronic documents that will be utilized in the transaction. The dealer will already have electronic versions of at least some of these documents, for example stored in a database or file system. For example, the dealer will typically have blank electronic copies of the current versions of its own sales and leasing contracts, as well as current versions of the state licensing and registration forms. If the dealer does not have a current electronic version of a document to be used in the transaction, in one implementation the electronic transaction management system may automatically obtain one. In this implementation, the electronic transaction management system may obtain new versions of relevant documents when they are made available, and/or may check for updates from time to time as desired. In other embodiments, the dealer or another party may download third party documents as desired, e.g., from target websites.

The documents in question will be in different formats. Some documents such as those created and maintained by the dealer (e.g., sales and leasing contracts) may be in editable, printable formats, such as Portable Document Format (PDF) or the native format of a standard word processor. Such documents may be edited on screen (or programmatically by extracting information concerning the transaction from a database or other source) to fill in transaction specific fields on the document (e.g., the transaction identifier, the customer's name, driver's license number, address, the vehicle identification number, etc.). Other documents are in formats intended to be printed on pre-formatted No Carbon Required (NCR) paper forms (Carbonless Paper), typically known as impact printer forms. An impact printer form is an NCR paper form that is loaded into a special printer called an impact printer, and when the document is printed the instructions to the printer direct the printing of specific fields at specific pre-determined locations on the pre-formatted NCR paper form (for example, printing the customer's name in a pre-formatted box on the paper form labelled "name," the address in a pre-formatted box on the paper form labelled "address," etc.). An impact printer form typically comprises multiple copies of NCR paper, so that when the impact printer prints the form, multiple copies are created (e.g., one for the dealer, one for the customer, one for the state, etc.). These forms are typically provided (e.g., sold) to the dealership along with operating software for completing the fields on screen and then printing the form. Impact printer forms are used in transactions such as auto sales for certain documents, such as title and registration related documentation used in some states.

An impact printer generally works by direct contact of an ink ribbon with paper. A metal or plastic head strikes the ink ribbon, whereby the ribbon is pressed against the paper and the desired character (letter, digit, dot, line) impression is printed on the sheet. Because of the force of the impact of the print head, impact printers are well suited to printing multiple page NCR paper copies. Prior to the adaptation of these forms for use in impact printers, the forms were completed by typing the information into the given boxes using a typewriter. The use of an impact printer to complete a form is a technological improvement over typing. Nonetheless, the fixed nature of impact printer forms intended for the printing of specific fields at specific pre-determined locations on the pre-formatted NCR paper requires that a new impact form be provided by the source (e.g., the Department of Motor Vehicles or the like) whenever any change is made to the form (e.g., if the positions of the boxes to be completed are moved, or if a new field is required in a new version of the form). Conventionally, different impact forms are supplied by different parties and differ across different geolocations as well. Conventionally, any and all impact printer forms used in a transaction are printed out, and then must be ink signed by the relevant parties to the transaction in pre-formatted signature boxes.

In some implementations, the electronic transaction management system automates and greatly improves this process by sending documents that are used in the transaction, regardless of the source or format, to a custom printer driver. As described in detail below, the custom printer driver receives the instructions to print each document, for example in a standard language used to control printers. Instead of printing the document, the custom printer driver interprets the print instructions to create a file in a standard format (e.g., PDF), containing the document. In the case of a document sent to the printer driver that is already in editable format, the custom printer driver simply saves the contents of the document into a file in the target standard format, e.g., a PDF file.

For impact printer forms and the like, the electronic transaction management system can create an electronic version of each impact printer form one time (e.g., by scanning or otherwise digitizing the paper form), and then use that copy multiple times, whenever that form is used in a transaction. When an instance of an impact printer form is used in a specific transaction, the electronic transaction management system may send instructions for printing specific fields of the specific document at pre-determined locations on a pre-formatted paper form to the custom printer driver. As with any type of form, instead of printing the document the custom printer driver interprets the print instructions to create a file in the standard format (e.g., PDF) containing the document. In the case of an impact form, instead of printing the specific document, the custom printer driver may add the specific fields of the specific document at the correct locations to a file in the standard format containing an electronic representation of the pre-formatted paper form. This representation of the pre-formatted paper form was created one time and may be used multiple times, as described above.

Regardless of the format and source of the document, a file containing the document in a standard format now exists. The specific fields of the documents can be automatically filled in with information concerning the transaction, taken automatically either from the dealer's records (e.g., in a database), from another source, and/or typed into an electronic representation of the document displayed on a computer screen. In the case of information concerning the customer, at the initiation of the transaction the customer may upload his/her driver's license to the dealership (e.g., using a web browser or a provided app for interfacing with and monitoring the transaction). The customer may also upload an authorization to complete the transaction electronically. Other content added to the documents can be information concerning the dealership, the vehicle being purchased or leased, licensing or other information from a government agency, information identifying the transaction itself, etc.

The completed electronic documents in the standard format may be electronically routed to the appropriate parties for electronic signature (e.g., the sales manager, financing manager, customer, etc.). The relevant parties may electronically sign the documents, thus completing the documentation for the transaction end-to-end, without requiring any ink signatures or paper documents, and without requiring the customer to physically come into the dealership. Once the transaction is completed, the vehicle may be delivered to the customer.

The electronic transaction management system can save all of the files used in the transaction, for example in directory or other location in a file system associated with the transaction. In another implementation, the contents of the files making up the transaction may be stored as a record in a database system or the like.

In one implementation, the electronic transaction management system may analyze the form itself and determine which type of content is associated with which box on the form. In this implementation the system may add metadata to the electronic representations of the pre-formatted paper forms, such that metadata identifies which type of content is associated with which specific pre-determined locations (e.g., this box is for entry of the customer's name, this box is for entry of the vehicle identification number, etc.). This enables the editing of the layout of the electronic representation of the pre-formatted paper, while preserving the metadata identifying specific content associated with specific locations on the edited form.

In another implementation, the electronic transaction management system can add metadata to the files in the standard format associated with the transaction, such that the metadata identifies types of content associated with specific fields (e.g., this field contains the customer's driver's license number, this field contains the transaction identifier, etc.). The electronic transaction management system can then save specific fields of specific ones of the files in the standard format associated with the transaction as a single record. In one implementation, this record is stored on a publicly accessible transaction log, such as a blockchain (e.g., Bitcoin, Ethereum, etc.).

In some implementations, one or more files in the standard format created by the custom printer driver containing non-printed print output are automatically validated. Validated files can correspond, for example, to a driver's license uploaded by a purchaser or lessee of a vehicle, or uploaded by a vehicle dealership. Other documents may also be uploaded and validated, such as, for example, United States (US) passport cards, US passport booklets, non-US passports, non-US driver's licenses, international driver's licenses, proof of auto insurance, proof of income, bank statements, proof of residency, etc. Automatic validation can be performed by, for example, a third party validation service, by the electronic transaction management system, by AI, etc.

Although this summary uses the purchase or lease of a vehicle from an automobile dealership as an example of a transaction, it is to be understood that the functionality of the electronic transaction management system and the custom printer driver may be utilized in the context of other types of transactions as desired.

The features and advantages described in this summary and in the following detailed description are not all-inclusive, and particularly, many additional features and advantages may be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The Figures depict various implementations for purposes of illustration only. One skilled in the art will readily recognize from the following discussion that other implementations of the structures and methods illustrated herein may be employed without departing from the principles described herein.

DETAILED DESCRIPTION

Figure 1:
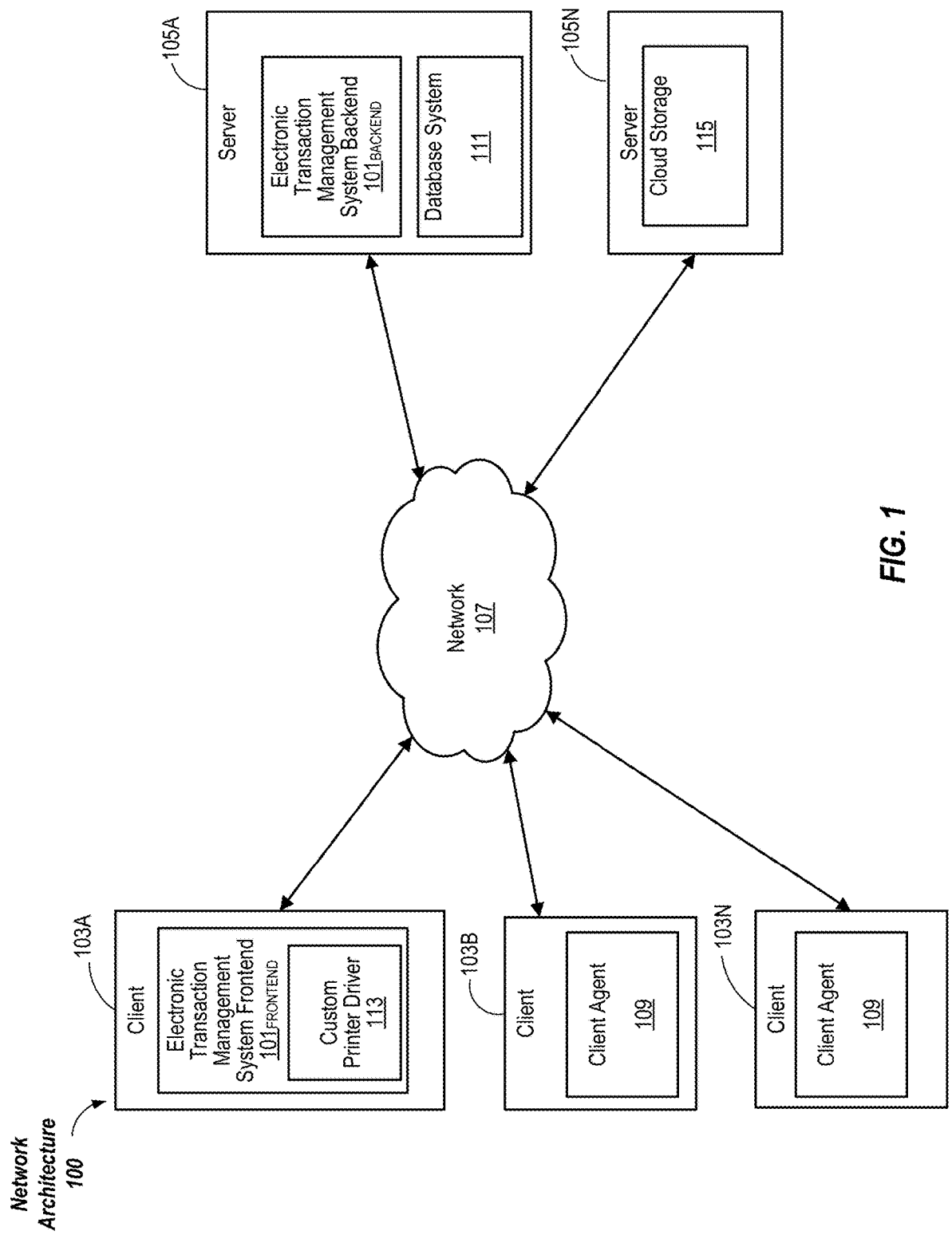
FIG. 1 illustrates a network environment in which an electronic transaction management system can operate, according to some implementations.

FIG. 1 is a high-level block diagram illustrating an exemplary network architecture 100 in which an electronic transaction management system 101 can be implemented. The illustrated network architecture 100 comprises multiple servers 105A and 105N (together may be referred to as "server 105") as well as multiple clients 103A, 103B, and 103N (together may be referred to as "client 103"). In FIG. 1, a frontend component $101_{FRONTEND}$ of the electronic transaction management system 101 is illustrated as residing on the client 103A, and a backend component $101_{BACKEND}$ of the electronic transaction management system 101 and a database system 111 are illustrated as residing on the server 105A. In one implementation, server 105A can be in the form of a backend server 105 made available by, e.g., a publisher of the electronic transaction management system 101. Cloud storage 115 is illustrating as residing on the server 105N. Cloud storage 115 may be in the form of, e.g., secure storage provided by, e.g., Amazon Web Services (AWS) or another cloud provider. A client agent 109 is illustrated as running on each of clients 103B-N. It is to be understood that this is an example only. In various implementations, various functionalities of electronic transaction management system 101 can be instantiated on a server 105, a client 103, or can be distributed among multiple servers 105 and/or clients 103. Additionally, although the database system 111 and cloud storage 115 are each illustrated as residing on a single server (105A and 105N respectively), it is to be understood that the database system 111 and/or the cloud storage 115 may (and often will) be distributed across multiple computing devices.

In FIG. 1 a custom printer driver 113 is illustrated as being a part of the frontend component of electronic transaction management system $101_{FRONTEND}$. It is to be understood that in some implementations the custom printer driver 113 may be instantiated separately from rather than as a part of the electronic transaction management system 101, or the functionalities of these systems may be distributed in other ways between different applications and systems as desired.

The clients 103B-N can be in the form of computing devices operated by users (e.g., customers). A user of a client computing device 103 can interact with the backend component electronic transaction management system $101_{BACKEND}$, for example by operating the client agent 109. A client agent 109 may be in the form of an application containing user-level functionality for utilizing and/or interacting with the electronic transaction management system 101. In some implementations, client agents 109 are not utilized. Clients 103B-N can be in the form of laptops, desktops and/or other types of computers/computing devices such as mobile computing devices capable of connecting to a network 115 and running applications (e.g., smartphones, tablet computers, wearable computing devices, etc.). Clients 103B-N are able to access the electronic transaction management system 101 over the network 115 via, for example, the client agent 109, a web browser or other client software (not shown).

Clients 103 and servers 105 can be implemented using computer systems 210 such as the one illustrated in FIG. 4 and described below. The clients 103 and servers 105 are communicatively coupled to a network 107, for example via a network interface 248 as described below in conjunction with FIG. 4. Servers 105 can be in the form of, e.g., desktop and/or rack-mounted computing devices, located, e.g., in IT departments and/or data centers. Although FIG. 1 illustrates three clients 103 and two servers 105 as an example, in practice many more (or fewer) clients 103 and/or servers 105 can be deployed. In one implementation, the network 107 is in the form of the Internet. Other and/or additional networks 107 or network-based environments can be used in other implementations.

Figure 2:
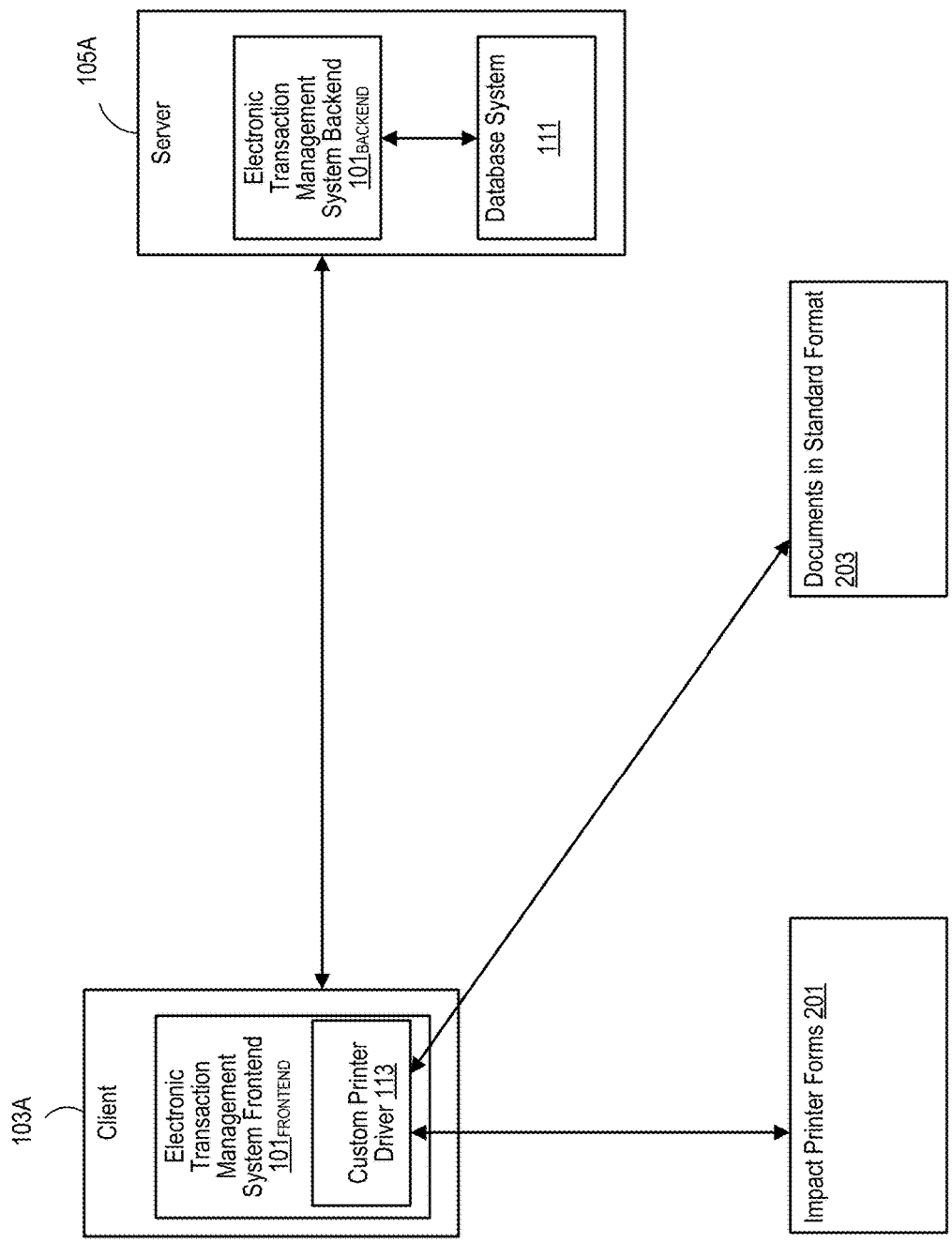
FIG. 2 illustrates the operation of an electronic transaction management system, according to some implementations.

FIG. 2 illustrates a frontend component of the electronic transaction management system $101_{FRONTEND}$ and custom printer driver 113 running in the system memory 217 of client 103A, the backend component of the electronic transaction management system $101_{BACKEND}$ and a database system 111 running in the system memory of server 105A, and cloud storage 115 residing on server 105N. As described above, the functionalities of the electronic transaction management system 101 and the custom printer driver 113 can be distributed among multiple computer systems 210, including within a cloud-based computing environment in which the functionalities of the electronic transaction management system 101 are provided as a service over a network 107. It is to be understood that although the frontend and backend of the electronic transaction management system 101, the custom printer driver 113 and the client agents 109 are illustrated in the Figures as discrete entities, the illustrated electronic transaction management system 101, custom printer driver 113 and client agents 109 represent collections of functionalities, which can be instantiated as a single or multiple modules on one or more computing devices 210 as desired.

It is to be understood that the functionalities of the electronic transaction management system 101, custom printer driver 113 and client agents 109 can be instantiated (for example as object code or executable images) within the system memory 217 (e.g., RAM, ROM, flash memory) of any computer system 210, such that when the processor 214 of the computer system 210 processes a module, the computer system 210 executes the associated functionality. As used herein, the terms "computer system," "computer," "client," "client computer," "server," "server computer" and "computing device" mean one or more computers configured and/or programmed to execute the described functionality. Additionally, program code to implement the functionalities of the electronic transaction management system 101, custom printer driver 113 and client agents 109 can be stored on computer-readable storage media. Any form of tangible computer readable storage medium can be used in this context, such as magnetic or optical storage media. As used herein, the term "computer-readable storage medium" does not mean an electrical signal separate from an underlying physical medium.

Figure 3:
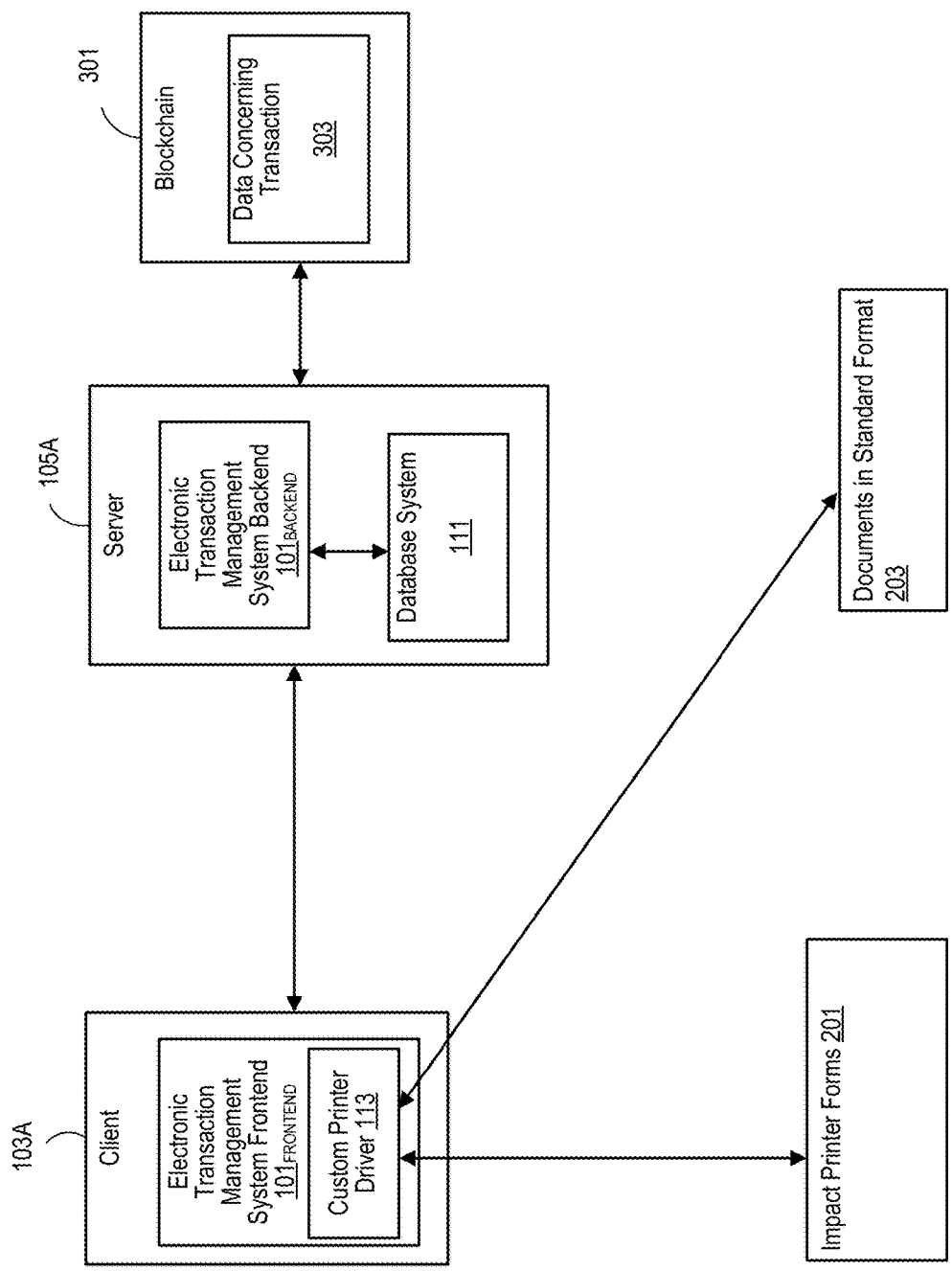
FIG. 3 illustrates another implementation of the operation of an electronic transaction management system, in which content concerning a completed transaction is stored on a blockchain.

As illustrated in FIG. 2, the electronic transaction management system 101 can automatically manage multiple electronic documents utilized in a given transaction. In the description of FIGS. 2-3, the purchase or lease of a vehicle is used as an example of a transaction. As explained above this is just an example, and the functionality of the electronic transaction management system 101 may be utilized in the context of other types of transactions as desired. In the example described in conjunction with FIGS. 2-3, the purchase of a vehicle is in the context of such a purchase being made from an auto dealership, by an individual customer. As described above, a plurality of different types of electronic documents in different formats and from different sources may be used in such a transaction, such as, for example, a sales or lease contract provided by the dealer, one or more licensing document(s) provided by a government agency of the state in which the transaction is occurring, and one or more additional documents provided by at least one third party, such as financing or warranty documents.

As explained above, the custom printer driver 113 may be installed at the dealership as part of the frontend of the electronic transaction management system $101_{FRONTEND}$. In the context of the operation of the electronic transaction management system 101, the term "custom printer driver" is used to mean a collection of functionalities instantiated that facilitates sending a document to a selected printer from the frontend of the electronic transaction management system $101_{FRONTEND}$, with the document being converted into instructions to a printer for printing the specific document, and subsequently, instead of actually printing the document, creating a file in a standard format 203 (e.g., PDF) containing the document, based on the received instructions to the printer for printing the specific document. In many implementations the custom printer driver 113 is instantiated in software, although a custom printer driver 113 may be instantiated as software, hardware, firmware or any combination of the three.

A conventional printer driver may be thought of as functionality (typically although not necessarily instantiated in software) that enables an application or system program on a computer to communicate with a printer. Because the custom printer driver 113 does not actually print the documents, the term "custom printer driver" is being used herein with a non-conventional meaning. The custom printer driver 113 enables an application program to specially process documents as described herein by sending them to a printer, although the end result is not printing the documents. As described in detail below, in some implementations the custom printer driver 113 utilizes conventional printer drivers to execute some of its functionalities, for example converting the contents of a file sent to the printer into instructions to a printer for printing that content.

In one implementation, the custom printer driver 113 includes multiple installed conventional printer drivers for printing documents in different formats (for example a printer driver that supports printing impact forms 201 to an impact printer, and a printer driver that supports printing documents in a standard format 203, such as PDF). Contemporary available operating systems such as Microsoft Windows provide such printer drivers for download. In this implementation, when a party operating the frontend of the electronic transaction management system $101_{FRONTEND}$ wishes to provide an electronic document to the customer printer driver 113 for processing as a part of the transaction, the party (e.g., a sales manager at the automobile dealership) may open the document, select print, and select an appropriate target printer (e.g., print "Impact Form to Transaction" for an impact form 201, print "To Transaction" for a PDF or word processing document). It is to be understood that the names given to the target printers given above are just examples, and other names may be assigned in other implementations as desired. Sending the document to the target printer may result in the contents s of the document being sent to a corresponding conventional printer driver (e.g., for printing impact forms 201 or documents in a standard format 203) which translates the contents of the file into instructions for a corresponding printer to print the specific document. In the case of an impact form 201, those instructions can be in the form of a file in a printer control language containing instructions for printing specific fields of the specific document at pre-determined locations on a pre-formatted paper form. A file in such a format contains the text itself, as well as control characters for moving the print head to specific locations before printing corresponding content. This format can be, for example, Epson Standard Code for Printers or XML Paper Specification (XPS), although different printer control languages can be used in different implementations. In the case of a document in PDF or Word format or the like, the instructions for a corresponding printer may be in, for example, PostScript (PS) or another page description language. Where the file is a PDF, it is already in PS and does not need to be translated. Where the file is, e.g., a .docx file, it may be translated to PS, for example by the corresponding underlying conventional printer driver.

The custom printer driver 113 may receive the output of the conventional printer driver(s) (i.e., the instructions to a printer for printing specific documents). Instead of sending that output to any printer, the custom printer driver 113 may create, for each given document, a file in a standard format 203 such as PDF containing the specific document, based on the received instructions to the printer for printing that document. In one implementation, files in a printer control language (e.g., instructions for printing impact forms 201) are placed in a given directory or folder. The custom printer driver 113 reads that directory, and detects new files that have been placed there, thus receiving the instructions to the printer. Based on the these received instructions to the printer for a given document, the custom printer driver 113 can parse the file in printer control language, and write the specific fields of the specific document to a file in a standard format 203 such as PDF containing an electronic representation of the pre-formatted paper form, at the pre-determined locations. To do so, the electronic transaction management system 101 can create an electronic representation of the pre-formatted paper form in the standard format one time (e.g., by scanning the given impact form 201 to a PDF file), store the created electronic representation of the pre-formatted paper form, and then use a copy of the created form whenever instructions to print given content to that specific form are being processed. When parsing the file in printer control language, the custom printer driver 113 interprets the control characters that direct the movement of the print head to a specific location on the paper form prior to printing corresponding text, and uses those instructions to locate the corresponding location in the PDF file at which to place the textual content. The custom printer driver 113 then writes the content to that location in the PDF file. The result is an editable document in the standard format 203 such as PDF, containing the content of the impact printer form 201, with the textual content that was sent to the printer filled in at the appropriate locations. In the case of instructions to print laser ready documents such as PDF or Word files, the corresponding conventional printer driver may output content in PS format describing the document (e.g., as a PDF file), which the custom printer driver 113 can then process.

In some implementations, when the electronic transaction management system 101 creates an electronic representation of a pre-formatted paper form in the standard format as described above, the electronic transaction management system 101 can also add metadata to the electronic representation of the pre-formatted paper form, such that the metadata identifies specific content associated with specific pre-determined locations. For example, the metadata could identify what type of text is to be placed in or at some or all boxes or other pre-formatted objects on the form (i.e., one specific box is for the customer's name, another specific box is for the customer's address, etc.). Such metadata enables the editing of the electronic representation of the pre-formatted paper form, for example by moving the position of pre-formatted objects on the form as desired, while preserving the metadata identifying associated specific content.

The electronic transaction management system 101 may automatically add content concerning the transaction to one or more corresponding fields of a file containing a specific document in the standard format 203, whether the file originated from an impact form 201 or otherwise. Such content may be present in the electronic records of the dealership, in which case the electronic transaction management system 101 may automatically glean that content from the dealership's records (e.g., by reading a local database or filesystem). In other cases, the provider of the electronic transaction management system 101 may create and/or maintain records with information concerning transactions. In this scenario, relevant content may be automatically supplied by the backend of electronic transaction management system $101_{BACKEND}$. In some cases, content concerning the transaction provided by a human user operating a computing device may be automatically added to a document, such as information typed in by a sales manager at the dealership. In some implementations, the electronic transaction management system 101 may automatically retrieve desired information from additional third party data sources as desired.

As an example of content concerning the transaction being automatically added to a document, content concerning the customer participating in the transaction may be added to at least one corresponding field of a file containing a specific document. Such content may include the customer's name, address, driver's license number, etc. Another example of content concerning the transaction that can be automatically added to a document is content concerning a merchant participating in the transaction, such as the name of the auto dealership, the dealership's address, licensing information concerning the dealership, etc. Content concerning an item being purchased or leased in the transaction can also be automatically added to a document, such as the vehicle identification number, make, model, year, color, options, etc. Another example of content is information provided by a governing agency to the transaction, such as the DMV or the like. In such cases, the information may be gleaned and managed by the backend of electronic transaction management system $101_{BACKEND}$. Content identifying the specific transaction may also be added to the document, such as a transaction number or the like.

The electronic transaction management system 101 may receive one or more electronic signatures for various specific documents concerning the transaction, and add those electronic signatures to the documents in the standard format 203 (e.g., PDF) at the appropriate location (e.g., the signature block for the signing party). More specifically, where a document is to be signed, the electronic transaction management system 101 may automatically route the document to the parties whose signatures are required (e.g., the sales manager at the auto dealership, the customer, etc.) and request electronic signatures. For example, to route the document to the sales manager, the electronic transaction management system 101 can notify the sales manager via the user interface of the frontend component of electronic transaction management system $101_{FRONTEND}$. The electronic transaction management system 101 may also notify the sales manager to e-sign the document by sending an email, instant message, etc. In the case of a customer, the electronic transaction management system 101 can notify the customer to e-sign a document via the interface of the client agent 109, which is on, for example, the customer's phone or laptop. The client agent 109 can use notifications to get the customer's attention. In addition or instead, the electronic transaction management system 101 may also notify/remind the customer to e-sign the document by sending a text, email, etc. Once an electronic-signature has been obtained, the electronic transaction management system 101 may automatically add the electronic signature to a corresponding location of the document. The process can be utilized to obtain all of the requisite electronic signatures for all of the documents that are part of the transaction, in the standard format (e.g., PDF files).

The electronic transaction management system 101 may then save the files containing all of the specific documents associated with the transaction, in the standard format, with the added content concerning the transaction and the electronic signature(s). In some implementations, the electronic transaction management system 101 associates each such file with the transaction, for example by adding or otherwise associating a transaction number or the like to or with the file. Such files may be stored, for example, as a database record associated with the transaction, or at a location in a file system associated with the transaction. Such electronic storage may be on backend server(s), in the cloud, at the dealership, or at other location(s) as desired.

FIG. 3 illustrates another implementation of the operation of an electronic transaction management system, in which content concerning a completed transaction is stored on a blockchain 301. In some implementations, the electronic transaction management system 101 adds metadata to the files in the standard format associated with the transaction, where metadata identifies types of content associated with specific fields. For example, the metadata could identify one field in a file as the name of the customer, another as the transaction identifier, another as the vehicle identification number, etc. In such as implementation, the electronic transaction management system 101 may automatically extract the content of specific fields of specific ones of the files associated with the transaction, and store them as a single record, for example on a publicly accessible transaction log. In other words, instead of (or in addition to) storing all of the files associated with the transaction, the electronic transaction management system 101 may extract desired fields from the files, and store the resulting extracted data concerning the transaction 303 as a single record. It is to be understood that which specific fields to extract from which specific documents is a variable design parameter, which can change between different implementations and scenarios as desired. In some implementations, the publicly accessible transaction log is in the form of a blockchain 301 such as Bitcoin or Ethereum.

Figure 5:
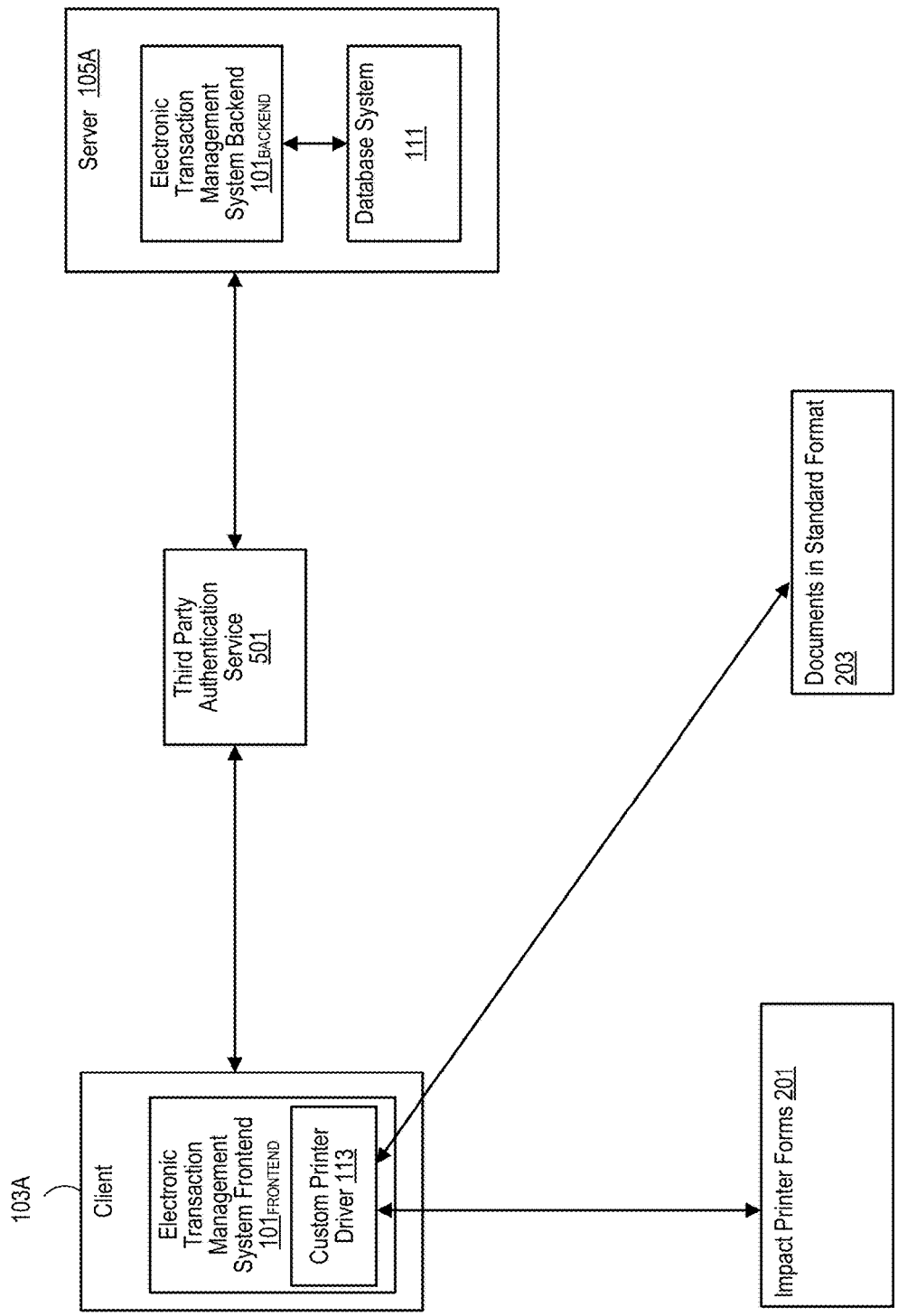
FIG. 5 illustrates another implementation of the operation of an electronic transaction management system, in which documents are automatically uploaded and verified.

Turning now to FIG. 5, in some implementations, some of the electronic documents utilized in a transaction to purchase or lease a vehicle may be uploaded (by the customer and/or the dealer), and automatically verified by the electronic transaction management system 101. For example, certain documents in the possession of the customer such as the customer's driver's license may be uploaded by the customer operating a client computing device 103 on which a client agent 109 is installed. As noted above, the client agent 109 may be in the form of an application containing user-level functionality for utilizing and/or interacting with the electronic transaction management system 101, and the client computing device 103 may be in the form of a mobile computing device capable of connecting to a network 115 and running applications (e.g., a smartphone, a tablet computer, a wearable computing device, etc.).

To upload a driver's license, the customer may operate the client agent 109, which in one implementation instructs the customer to use the camera of the client device 103 (e.g., a smartphone) to take a picture of the front side of the driver's license, and then to scan the bar code on the back of the driver's license. These two resulting images may then be transmitted by the client agent 109 to the electronic transaction management system 101 over the network 115. In another implementation, the customer's driver's license may be uploaded at the deal site, for example by the frontend component $101_{FRONTEND}$ of the electronic transaction management system 101, which can in turn transmit the images over the network 115 to the backend component $101_{BACKEND}$ of the electronic transaction management system 101.

In some implementations, the electronic transaction management system 101 can prompt the customer to upload one or more specific documents needed for the transaction, for example by texting or emailing a notification (e.g., a link) to the customer (e.g., via the client agent 109), which then may walk the customer through the steps of uploading the desired documents (e.g., through the functionality of the client agent 109). In one implementation, the notification is in the form of a link with embedded login information, such that activating the link logs the customer into the electronic transaction management system 101 and facilitates the document upload. In some implementations, the link logs the customer in on a write-only basis, so that the customer's personal identifiable information is further protected. In other implementations, the customer logs-in to the electronic transaction management system 101 through the client agent 109 directly, or in other ways such as through a web interface.

It is to be understood that the customer's driver's license is just one type of document that can be uploaded in this context. Different types of documents under the customer's control may be desirable or required to complete the transaction by various parties to the transaction (e.g., a DMV, a party providing financing, etc.) and/or government regulations. Other examples of documents that can be uploaded and validated include passport cards, passport booklets, foreign passports, foreign or internation driver's licenses, proof of auto insurance such as an insurance card or insurance declaration page, bank statements, pay stubs, utility bills, etc. It is to be understood that in different implementations, any document associated with or required by the deal may be automatically uploaded as desired.

As explained above, the custom printer driver 113 may receive the output of the conventional printer driver(s) (i.e., the instructions to a printer for printing specific documents). Instead of sending that output to any printer, the custom printer driver 113 may create, for each given document, a file in a standard format 203 such as PDF containing the specific document, based on the received instructions to the printer for printing that document. As also explained above, the electronic transaction management system 101 may automatically add content concerning the transaction to one or more corresponding fields of a file containing a specific document in the standard format 203. Such content may include content uploaded by the customer, such as, for example, the customer's name, address, driver's license number, etc.

Returning now to the discussion of uploaded documents, once the uploaded documents have been processed by the custom printer driver 113 and used to create a file in a standard format 203 such as PDF containing the specific document, the electronic transaction management system 101 can validate the uploaded document (or more preciously, validate the file in the standard format 203 such as PDF containing the specific uploaded document) in a number of different ways. For example, the electronic transaction management system 101 can utilize a third party authentication service 501 (by, e.g., transmitting the file and a validation request to third party authentication service 501), in order to confirm that a driver's license (or other type of document such as a passport, etc.) is valid. Such third party services 501 may communicate with issuing governmental or other organizations (e.g., DMVs, insurance companies, etc.) to ensure that the document in question is a valid one, issued by a legitimate agency to the party in question, and that the data thereon is accurate. The third party service may then transmit a validation confirmation back to the electronic transaction management system 101. The third party service 501 and/or the electronic transaction management system 101 can also examine the form of the document (e.g., by programmatically parsing the document), and ensure that it is in the actual format of the expected document, e.g., that the layout and/or content of the document is in the format of, e.g., what a driver's license from a given state or a utility bill from a given company is expected to be. The electronic transaction management system 101 can also programmatically compare the data from the document to ensure internal consistency (e.g., that the data on the front of a driver's license matches the data encoded in the bar code or QR code on the back). In some implementations, data from the document being validated is compared to data already in the system concerning the customer, to ensure consistency (for example, not only is a given driver's license a valid one, but that the driver's license is that of the actual customer and not another party). In some implementations, artificial intelligence is used to interrogate the document to glean validation information therefrom. It is to be understood that uploaded documents can be validated in these and other ways, at any desired level of granularity.

If a document is found not to be valid, the electronic transaction management system 101 can note it as such, and take a desired action in response, such as to delay the transaction until a valid document is provided, cancel the transaction, report an attempted use of a fraudulent document to the proper authorities, etc. In response to an uploaded document being verified, the electronic transaction management system 101 can accept the uploaded document and proceed with the transaction.

Figure 6:
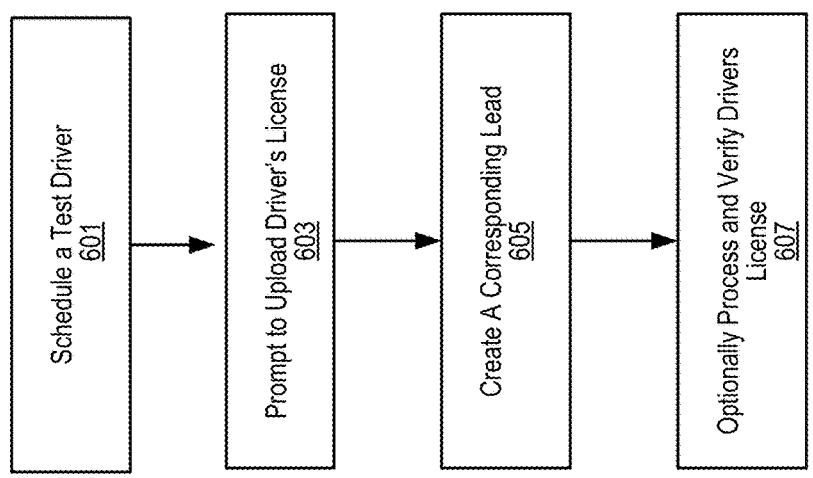
FIG. 6 illustrates steps for automatically uploading and verifying a driver's license in the context of the scheduling of a test drive, according to one implementation.

Turning now to FIG. 6, in some implementations a potential-customer can schedule 601 a test drive of a particular vehicle. For example, the potential-customer may schedule a test drive by browsing available vehicles listed by a specific dealer (e.g., on that dealer's website), or by browsing vehicles available from various dealers listed by an original equipment manufacturer (OEM) or other third party. For example, a specific OEM may have a feature to search for specific vehicles having certain parameters listed by any participating dealer in a given geographic area, such as cars of a given make, model, year, configuration, and/or color, etc., located within a given distance from the potential-customer performing the search. In response to scheduling a test drive for a given specific vehicle being sold by a party that supports the use of the electronic transaction management system 101, the electronic transaction management system 101 can prompt 603 the potential-customer to upload their driver's license, for example via the client agent 109 using the procedure described above. Further in response to the potential-customer scheduling a test drive, the electronic transaction management system 101 can automatically create 605 a lead for the dealer, including the potential-customer's driver's license and any other information entered in conjunction with scheduling the test drive. The lead enables the dealer to see the scheduled appointment and the driver's license and other entered information, and follow-up with the potential-customer if desired. If a transaction occurs, for example if the potential-customer becomes an actual customer and purchases or leases the vehicle (or a different vehicle), the electronic transaction management system 101 may process and verify 607 the uploaded driver's license as described above. It is to be understood that leads may be created for dealerships (and/or OEMS) in response to uploading documents and/or types of documents other than driver's licenses, using the functionality as described above.

Figure 4:
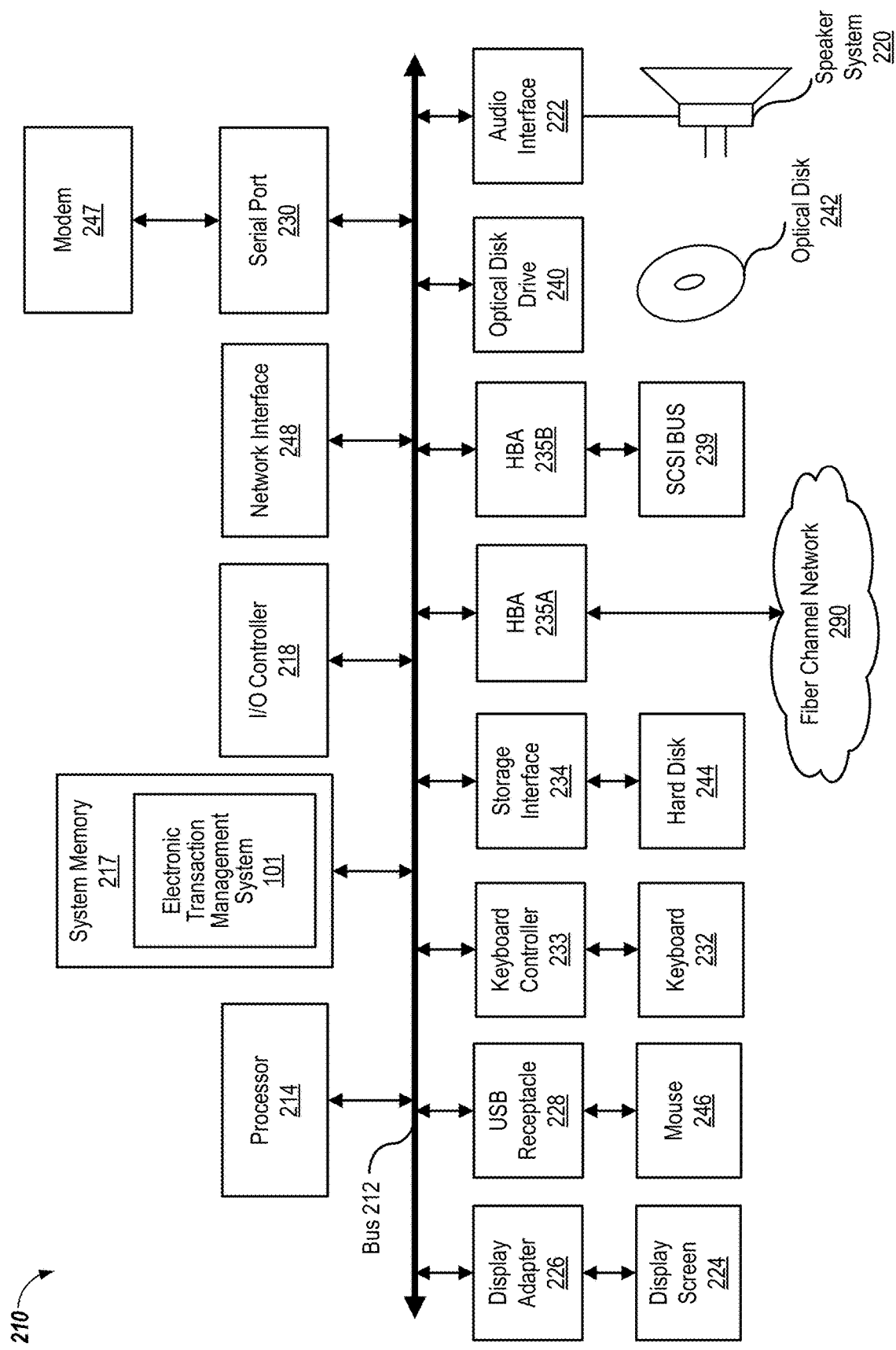
FIG. 4 illustrates a computer system suitable for implementing an electronic transaction management system, according to some implementations.

FIG. 4 is a block diagram of an example computer system 210 suitable for implementing an electronic transaction management system 101. Both endpoint computing devices 103 and backend computer systems can be implemented in the form of such computer systems 210. As illustrated, one component of the computer system 210 is a bus 212. The bus 212 communicatively couples other components of the computer system 210, such as at least one processor 214, system memory 217 (e.g., random access memory (RAM), read-only memory (ROM), flash memory), an input/output (I/O) controller 218, an audio output interface 222 communicatively coupled to an audio output device such as a speaker 220, a display adapter 226 communicatively coupled to a video output device such as a display screen 224, one or more interfaces such as Universal Serial Bus (USB) receptacles 228, serial ports 230, parallel ports (not illustrated), etc., a keyboard controller 233 communicatively coupled to a keyboard 232, a storage interface 234 communicatively coupled to one or more hard disk(s) 244 (or other form(s) of storage media), a host bus adapter (HBA) interface card 235A configured to connect with a Fiber Channel (FC) network 290, an HBA interface card 235B configured to connect to a SCSI bus 239, an optical disk drive 240 configured to receive an optical disk 242, a mouse 246 (or other pointing device) coupled to the bus 212, e.g., via a USB receptacle 228, a modem 247 coupled to bus 212, e.g., via a serial port 230, and one or more wired and/or wireless network interface(s) 248 coupled, e.g., directly to bus 212.

Other components (not illustrated) may be connected in a similar manner (e.g., document scanners, digital cameras, printers, etc.). Conversely, all of the components illustrated in FIG. 4 need not be present (e.g., smartphones and tablets typically do not have optical disk drives 240, external keyboards 232 or external pointing devices 246, although various external components can be coupled to mobile computing devices via, e.g., USB receptacles 228). The various components can be interconnected in different ways from that shown in FIG. 4.

The bus 212 allows data communication between the processor 214 and system memory 217, which, as noted above may include ROM and/or flash memory as well as RAM. The RAM is typically the main memory into which the operating system 250 and application programs are loaded. The ROM and/or flash memory can contain, among other code, the Basic Input-Output system (BIOS) which controls certain basic hardware operations. Application programs can be stored on a local computer readable medium (e.g., hard disk 244, optical disk 242) and loaded into system memory 217 and executed by the processor 214. Application programs can also be loaded into system memory 217 from a remote location (i.e., a remotely located computer system 210), for example via the network interface 248 or modem 247. In FIG. 4, the electronic transaction management system 101 is illustrated as residing in system memory 217.

The storage interface 234 is coupled to one or more hard disks 244 (and/or other standard storage media). The hard disk(s) 244 may be a part of computer system 210 or may be physically separate and accessed through other interface systems.

The network interface 248 and/or modem 247 can be directly or indirectly communicatively coupled to a network 115 such as the internet. Such coupling can be wired or wireless.

As will be understood by those familiar with the art, the subject matter described herein may be embodied in other specific forms without departing from the spirit or integral characteristics thereof. Likewise, the particular naming and division of the portions, modules, agents, managers, components, functions, procedures, actions, layers, features, attributes, methodologies, data structures and other aspects are not mandatory or significant, and the entities used that implement the subject matter described herein may have different names, divisions and/or formats. The foregoing description, for purpose of explanation, has been described with reference to specific implementations. However, the illustrative discussions above are not intended to be exhaustive or limiting to the precise forms disclosed. Many modifications and variations are possible in view of the above teachings. The implementations were chosen and described in order to best explain relevant principles and their practical applications, to thereby enable others skilled in the art to best utilize various implementations with or without various modifications as may be suited to the particular use contemplated.

In some instances, various implementations may be presented herein in terms of algorithms and symbolic representations of operations on data bits within a computer memory. An algorithm is here, and generally, conceived to be a self-consistent set of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, bytes, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout this disclosure, discussions utilizing terms including "processing," "computing," "calculating," "determining," "displaying," or the like, refer to the action and processes of a computer system, or similar electronic device, that manipulates and transforms data represented as physical (electronic) quantities within the computer system's registers and memories into other data similarly represented as physical quantities within the computer system memories or registers or other such information storage, transmission or display devices.

Finally, the structure, algorithms, and/or interfaces presented herein are not inherently tied to any particular computer or other apparatus. Various general-purpose systems may be used with programs in accordance with the teachings herein, or it may prove convenient to construct more specialized apparatus to perform the method blocks. The structure for a variety of these systems will appear from the description above. In addition, the specification is not described with reference to any particular programming language. It will be appreciated that a variety of programming languages may be used to implement the teachings of the specification as described herein.

Accordingly, the disclosure is intended to be illustrative, but not limiting.

What is claimed is:

1. A computer implemented method comprising:
   managing a plurality of electronic documents utilized in a transaction to purchase or lease a vehicle, the electronic documents being in separate formats originating from different sources, the different sources including at least two from a group of sources including a vehicle dealership, a state government department that licenses and registers vehicles, a third party financial institution, a third party supplier of vehicle warranties, a third party supplier of post-sale vehicle services, and a third party supplier of impact printer forms, wherein at least one of the sources is a third party to the transaction;
   for separate ones of the electronic documents:
      receiving, by a custom printer driver, instructions to a printer for printing the specific document;
      instead of printing the specific document, creating, by the custom printer driver, a file in a standard format containing non-printed print output of the specific document, based on the received instructions to the printer for printing the specific document;

saving the file containing non-printed print output of the specific document in the standard format; and associating the file containing non-printed print output of the specific document in the standard format with the transaction; and automatically validating at least a first given specific file in the standard format created by the custom printer driver containing non-printed print output;

responsive to determining that a file created by the custom printer driver containing non-printed print output is not valid, delaying the transaction until a valid corresponding document is provided;

automatically adding content concerning the transaction to at least one corresponding field of a given second specific file created by the customer printer driver containing non-printed print output in the standard format of the specific document corresponding to the given second specific file created by the customer printer driver;

receiving at least one electronic signature for the specific document corresponding to the given second specific file created by the customer printer driver; and automatically adding the at least one electronic signature to at least one corresponding location of the given second specific document in the standard format.

2. The method of claim 1 further comprising:
the first given specific file created by the custom printer driver having originated from a purchaser or lessee of the vehicle, responsive to the purchaser or lessee having uploaded a document corresponding to the first given specific file.

3. The method of claim 2 wherein:
the uploaded document corresponding to the first given specific file further comprises a driver's license of the purchaser or lessee of the vehicle.

4. The method of claim 3 wherein:
the uploaded driver's license of the purchaser or lessee of the vehicle further comprises an image of a first side of the driver's license and a scan of a bar code on a second side of the driver's license.

5. The method of claim 2 further comprising:
prompting the purchaser or lessee of the vehicle to upload the document corresponding to the first given specific file by transmitting a link to the purchaser or lessee, the transmitted link containing embedded login information to a server that facilitates document uploading.

6. The method of claim 1 further comprising:
the first given specific file created by the custom printer driver having originated from the vehicle dealership, responsive to the vehicle dealer having uploaded a document corresponding to the first given specific file.

7. The method of claim 1 further comprising:
the uploaded document corresponding to the first given specific file further comprises one from a group consisting of: a United States (US) passport card, a US passport booklet, a non-US passport, a non-US driver's license, an international driver's license, proof of auto insurance, proof of income, a bank statement, or proof of residency.

8. The method of claim 1 further comprising:
automatically adding content concerning the transaction to at least one corresponding field of the given first specific file created by the customer printer driver containing non-printed print output in the standard format of the specific document.

9. The method of claim 1 wherein automatically validating a specific file in the standard format created by the custom printer driver containing non-printed print output further comprises:
transmitting a request to validate the specific file to a third party authentication service; and
receiving validation results from the third party validation service concerning the specific file.

10. The method of claim 1 wherein automatically validating a specific file in the standard format created by the custom printer driver containing non-printed print output further comprises:
programmatically parsing the specific file to determine whether its form is that of an expected document type.

11. The method of claim 1 wherein automatically validating a specific file in the standard format created by the custom printer driver containing non-printed print output further comprises:
programmatically comparing at least a first datum of the specific file to at least a second datum of the specific file, to verify internal consistency of the specific file.

12. The method of claim 1 wherein automatically validating a specific file in the standard format created by the custom printer driver containing non-printed print output further comprises:
programmatically comparing at least content of the specific file to content of at least one separate maintained electronic document, to ensure consistency between content of the specific file and content of the at least one separate maintained electronic document.

13. The method of claim 1 wherein automatically validating a specific file in the standard format created by the custom printer driver containing non-printed print output further comprises:
ensuring that the corresponding document was issued by a legitimate agency.

14. The method of claim 1 wherein automatically validating a specific file in the standard format created by the custom printer driver containing non-printed print output further comprises:
determining that content of the specific file is accurate.

15. The method of claim 1 wherein automatically validating a specific file in the standard format created by the custom printer driver containing non-printed print output further comprises:
using artificial intelligence to interrogate the specific file to glean validation information.

16. The method of claim 1 further comprising:
responsive to determining that a file created by the custom printer driver containing non-printed print output is valid, accepting the file and continuing with the transaction.

17. The method of claim 1 further comprising:
scheduling a test drive of a specific vehicle for a potential-customer of the vehicle dealership, in response to receiving a corresponding electronic request from the potential-customer;
prompting the potential-customer to upload their driver's license;
receiving an electronic document containing an image of the driver's license of the potential-customer, responsive to the potential-customer having uploaded the electronic document containing the image; and
automatically creating a sales lead for the vehicle dealership, the sales lead containing information from the uploaded driver's license.

18. A computer system comprising:
at least one processor;
system memory;
an electronic document managing module residing in the system memory, the electronic document managing module being configured to manage a plurality of electronic documents utilized in a transaction to purchase or lease a vehicle, the electronic documents being in separate formats originating from different sources, the different sources including at least two from a group of sources including a vehicle dealership, a state government department that licenses and registers vehicles, a third party financial institution, a third party supplier of vehicle warranties, a third party supplier of post-sale vehicle services, and a third party supplier of impact printer forms, wherein at least one of the sources is a third party to the transaction;
a custom printer driver residing in the system memory, the custom printer driver being configured to, for separate ones of the documents of the plurality of documents, receive instructions for printing the specific document, and instead of printing the specific document, to create a file in a standard format containing the specific document, based on the received instructions to the printer for printing the specific document;
a validating module residing in the system memory, the validating module being configured to, for separate ones of the documents of the plurality of documents, validate the file containing the specific document in the standard format, and further configured to delay the transaction until a valid corresponding document is provided, responsive to determining that a file created by the custom printer driver containing non-printed print output is not valid;
a content adding module residing in the system memory, the content adding module being configured to, for separate ones of the documents of the plurality of documents, automatically add content concerning the transaction to at least one corresponding field of the file containing the specific document in the standard format;
an electronic-signature processing module residing in the system memory, the electronic-signature processing module being configured to, for separate ones of the documents of the plurality of documents, receive at least one electronic-signature for the specific document, and to automatically add the at least one electronic-signature to at least one corresponding location of the specific document in the standard format;
a document saving module residing in the system memory, the document saving module being configured to, for separate ones of the documents of the plurality of documents, save the file containing the specific document in the standard format with the added content concerning the transaction and the at least one electronic signature; and
an association module residing in the system memory, the association module being configured to, for separate ones of the documents of the plurality of documents, associate the file containing the specific document in the standard format with the transaction.

19. A computer implemented method comprising:
managing a plurality of electronic documents utilized in a transaction to purchase or lease a vehicle, the electronic documents being in separate formats originating from different sources, the different sources including at least two from a group of sources including a vehicle dealership, a state government department that licenses and registers vehicles, a third party financial institution, a third party supplier of vehicle warranties, a third party supplier of post-sale vehicle services, and a third party supplier of impact printer forms, wherein at least one of the sources is a third party to the transaction;
for separate ones of the electronic documents:
receiving, by a custom printer driver, instructions to a printer for printing the specific document;
instead of printing the specific document, creating, by the custom printer driver, a file in a standard format containing non-printed print output of the specific document, based on the received instructions to the printer for printing the specific document;
saving the file containing non-printed print output of the specific document in the standard format; and
associating the file containing non-printed print output of the specific document in the standard format with the transaction; and
automatically validating at least a first given specific file in the standard format created by the custom printer driver containing non-printed print output;
wherein automatically validating a specific file in the standard format created by the custom printer driver containing non-printed print output further comprises performing at least one step from a group of steps consisting of: transmitting a request to validate the specific file to a third party authentication service, and receiving validation results from the third party validation service concerning the specific file; programmatically parsing the specific file to determine whether its form is that of an expected document type; programmatically comparing at least a first datum of the specific file to at least a second datum of the specific file, to verify internal consistency of the specific file; programmatically comparing at least content of the specific file to content of at least one separate maintained electronic document, to ensure consistency between content of the specific file and content of the at least one separate maintained electronic document; and ensuring that the corresponding document was issued by a legitimate agency;
automatically adding content concerning the transaction to at least one corresponding field of a given second specific file created by the customer printer driver containing non-printed print output in the standard format of the specific document corresponding to the given second specific file created by the customer printer driver;
receiving at least one electronic signature for the specific document corresponding to the given second specific file created by the customer printer driver; and
automatically adding the at least one electronic signature to at least one corresponding location of the given second specific document in the standard format.

20. The method of claim 19 further comprising:
the first given specific file created by the custom printer driver having originated from a purchaser or lessee of the vehicle, responsive to the purchaser or lessee having uploaded a document corresponding to the first given specific file.

* * * * *